US012783227B2

(12) United States Patent
Dong

(10) Patent No.: US 12,783,227 B2
(45) Date of Patent: Nov. 3, 2026

(54) METHOD, APPARATUS, DEVICE, MEDIUM AND PRODUCT FOR APPLICATION PACKAGE GENERATION

(71) Applicant: Beijing Zitiao Network Technology Co., Ltd., Beijing (CN)

(72) Inventor: Yongkang Dong, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 272 days.

(21) Appl. No.: 18/620,557

(22) Filed: Mar. 28, 2024

(65) Prior Publication Data

US 2024/0329971 A1 Oct. 3, 2024

(30) Foreign Application Priority Data

Mar. 31, 2023 (CN) ........................ 202310343243.4

(51) Int. Cl.
*G06F 8/65* (2018.01)

(52) U.S. Cl.
CPC ..................................... *G06F 8/65* (2013.01)

(58) Field of Classification Search
CPC ........................................................ G06F 8/65
USPC ................................ 717/101–107, 169, 172
See application file for complete search history.

(56) References Cited

U.S. PATENT DOCUMENTS 12,056,479 B2 * 8/2024 Chen .................. G06F 9/44536
2020/0226232 A1 * 7/2020 Gagnerot ................. G06F 8/76

OTHER PUBLICATIONS

Artyom, "[AAR to DEX] Loading and Running Code at Runtime in Android Application", 2019, Medium, https://medium.com/ , 8 pages. (Year: 2019).*
Android Developers, "Create an Android library", 2022, retrieved from https://developer.android.com/studio/projects/android-library, 11 pages. (Year: 2022).*

* cited by examiner

*Primary Examiner* — Ted T. Vo
(74) *Attorney, Agent, or Firm* — BakerHostetler

(57) ABSTRACT

Disclosed are a method, an apparatus, a device, a medium and a product for application package generation, wherein the method comprises: acquiring a code resource file of a target application, and parsing attribute information of a code resource in each class file in the code resource file; distributing each class file into a corresponding sub-code resource package in accordance with the attribute information; generating a target application package in a target format based on each sub-code resource package; wherein the code resource file of the target application is an AAR file of the target application program.

15 Claims, 3 Drawing Sheets

METHOD, APPARATUS, DEVICE, MEDIUM AND PRODUCT FOR APPLICATION PACKAGE GENERATION

CROSS-REFERENCE TO RELATED APPLICATION(S)

This application claims priority to Chinese Application No. 202310343243.4 filed on Mar. 31, 2023, the disclosure of which is incorporated herein by reference in its entity.

FIELD

Embodiments of the present disclosure relate to a technical field of application development, and more particularly, to a method, an apparatus, a device, a medium and a product for application package generation.

BACKGROUND

In a process of packaging and launching an application, an AAR (Android Archive) file package of the application is generally uniformly packaged into a base resource package, in which may contain some code files which are not necessarily packaged into the base resource package. Thus, there is further compression optimization of the base code file package to enable a user to download a base code file package that occupies less memory space when downloading the application.

SUMMARY

The present disclosure provides a method, an apparatus, a device, a medium and a product for application package generation, which can perform a sub-packaging process on an application resource at a class file granularity so as to obtain an application package occupying a smaller storage space after code resource allocation is optimized.

In a first aspect, embodiments of the present disclosure provide a method for application package generation comprising:

acquiring a code resource file of a target application, and parsing attribute information of a code resource in each class file in the code resource file;

distributing each class file into a corresponding sub-code resource package in accordance with the attribute information;

generating, based on each sub-code resource package, a target application package in a target format;

wherein the code resource file of the target application is an AAR file of the target application.

In a second aspect, embodiments of the present disclosure further provide an apparatus for application package generation comprising:

a code attribute analysis module for acquiring a code resource file of a target application and parsing attribute information of a code resource in each class file in the code resource file;

a class file sub-packaging module for distributing each class file into a corresponding sub-code resource package in accordance with the attribute information;

an application package generation module for generating, based on each sub-code resource package, a target application package in a target format;

wherein the code resource file of the target application is an AAR file of the target application.

In a third aspect, embodiments of the present disclosure further provide an electronic device comprising:

one or more processors;

a storage for storing one or more programs, when the one or more programs are executed by the one or more processors, the one or more processors are caused to implement a method for application package generation of any of embodiments of the present disclosure.

In a fourth aspect, embodiments of the present disclosure further provide a non-transitory storage medium containing computer-executable instructions which perform, when executed by a computer processor, a method for application package generation as described in any of embodiments of the present disclosure.

In a fifth aspect, embodiments of the present disclosure further provide a computer program product comprising a computer program which, when executed by a processor, implements a method for application package generation as described in any of embodiments of the present disclosure.

With the embodiments of the present disclosure, in a process of generating an application package based on an AAR file of a target application, after a code resource file of the target application is acquired, first, attribute information of a code resource in each class file in the code resource file is parsed; then, each class file is distributed into a corresponding sub-code resource package according to the attribute information, so that the code resource file is sub-packaged with a smaller file sub-packaging granularity, making the sub-packaging of the code resource file more accurate; and finally, a target application package in a target format is generated based on each sub-code resource package after code resource file sub-packaging is performed correctly, so that the volume of a base resource package of a target application can be reduced, and the installation and use of the target application are more friendly to a user. The solution(s) of embodiments of the present disclosure solve a problem that the base resource package is not simple enough due to a large file packaging granularity of an application package, and can perform a sub-packaging process of an application resource with a class file granularity so as to obtain an application package occupying a smaller storage space after code resource allocation is optimized.

BRIEF DESCRIPTION OF THE DRAWINGS

The above and other features, advantages, and aspects of embodiments of the present disclosure will become more apparent with reference to the following detailed description when taken in conjunction with the drawings. Throughout the drawings, a same or similar reference numeral indicates a same or similar element. It should be understood that the drawings are illustrative, and that elements and components are not necessarily drawn to scale.

DETAILED DESCRIPTION OF EMBODIMENTS

Figure 1:
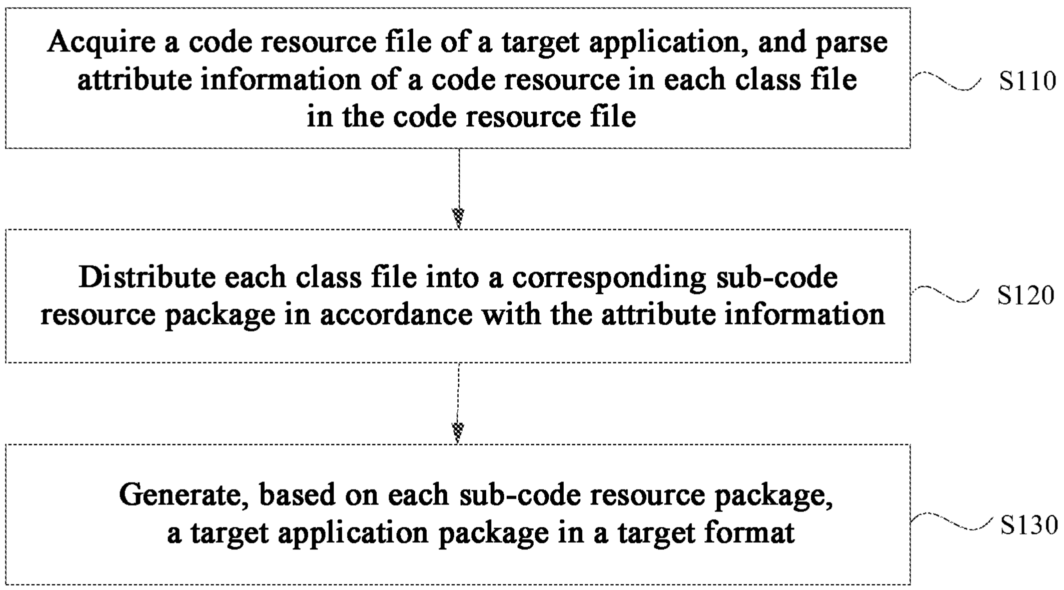
FIG. 1 is a flow diagram of a method for application package generation provided by an embodiment of the present disclosure.

Hereinafter, embodiments of the present disclosure will be described in more detail with reference to the drawings. While certain embodiments of the present disclosure have been illustrated in the drawings, it is to be understood that the disclosure may be embodied in various forms and should not be limited to the embodiments set forth herein, and rather, these embodiments are provided to give a thorough and complete understanding of the disclosure. It should be understood that the drawings and embodiments of the present disclosure are for illustrative purposes only and are not intended to limit the scope of the present disclosure.

It should be understood that various steps described in implementations of a method of the present disclosure may be performed in different orders and/or in parallel. Moreover, implementations of the method may include an additional step and/or omit performing the step(s) shown. The scope of the present disclosure is not limited in this respect.

As used herein, the terms "include", "comprise", and variations thereof are open-ended terms, i.e. "including, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that references to "first", "second", and the like in the disclosure are only used to distinguish between different apparatuses, modules, or units and are not intended to limit the order or interdependence of functions performed by these apparatuses, modules, or units.

It should be noted that a modifier of "a" or "an" in the disclosure is intended to be illustrative and not restrictive, and those skilled in the art will understand that it is to be interpreted as "one or more" unless the context clearly indicates otherwise.

It should be understood that before technical solution(s) disclosed in the embodiments of the present disclosure are used, a user should be informed of the type, the scope of use, the scenario of use, etc. of personal information involved in the present disclosure in an appropriate manner according to relevant laws and regulations.

For example, in response to an active request of a user being received, prompt information is sent to the user to explicitly prompt the user that an operation requested by the user will require the acquisition and use of personal information of the user. Accordingly, the user can autonomously choose whether to provide personal information to software or hardware, such as an electronic device, an application, a server or a storage medium, which executes operations of technical solution(s) of the present disclosure, according to the prompt information.

As an alternative but non-limiting implementation, in response to an active request being received from the user, the prompt information may be sent to the user, for example, in the form of a pop-up window in which the prompt information may be presented in text. In addition, the pop-up window may further carry a selection control for the user to select "agree" or "disagree" to provide personal information to the electronic device.

It is to be understood that processes of the notification and acquisition of user authorization as described above are merely illustrative and do not limit implementations of the present disclosure, and that other ways that satisfy relevant laws and regulations may also be applied to implementations of the present disclosure.

It is to be understood that the data involved in this technical solution (including but not limited to the data itself and the acquisition or use of the data) shall comply with the requirements of relevant laws and regulations and relevant provisions.

FIG. 1 is a flow diagram of a method for application package generation provided by an embodiment of the present disclosure, and the embodiment of the present disclosure is applicable to a scenario of packaging an application into a distribution format of Android App Bundle (AAB), and the method can be executed by an apparatus for application package generation, and the apparatus can be implemented in the form of software and/or hardware, optionally, implemented by an electronic device, and the electronic device can be a mobile terminal, a PC or a server, etc.

As shown in FIG. 1, the method for application package generation comprises:

S110, acquiring a code resource file of a target application, and parsing attribute information of a code resource in each class file in the code resource file.

The target application can be any application that is required to be packaged in application development, and an application package that meets format requirements of a launch platform of the target application can be generated by correctly distributing a code resource file of the target application and finally compiling and packaging the same.

The code resource file of the target application may be a class file in an AAR (Android Archive) file upon which a corresponding target application depends. The AAR is a binary archive file of an Android library project, with a filename extension of .aar, which contains class file(s), and also includes values, layout, manifest and other resource file(s) in Android.

Generally, when an AAB package of a target application is generated based on code resource file packaging of the target application, a base resource module (Base) in the AAB package and an AAR on which each self-adaptive function module (Dynamic Features) is dependent are distributed together into the Base for packaging, while code resource file(s) that are not necessarily packaged in the Base package will be contained therein. On the basis of this, there is a certain compression and optimization space for the Base package, so that when the user downloads the base resource package of the target application, the base resource package that occupies less memory space is downloaded.

In the embodiment, in order to achieve a goal of sampling and optimizing contents of the base resource package, taking a class file as the sub-packaging granularity of the code resource file, attribute information of a code resource in each class file in the code resource file is analyzed so as to determine a sub-packaging result of the class file(s). In this case, the attribute information can be any attribute information which can affect the distribution result of the class file(s), for example, attribute information such as a dependency of a class in a class file, a scope of a class, and directory attribution information.

Specifically, when the attribute information of the code resource in each class file in the code resource file is parsed, information indicating a class file dependency in a bytecode content of each class file can be extracted so as to obtain attribute information of a target.

S120, distributing each class file into a corresponding sub-code resource package in accordance with the attribute information.

Specifically, the distribution in the embodiment refers to distribution from dimension(s) of a function module to which the code resource belongs. Dimensions of function modules of a code resource file in an application package in an AAB format are divided into a base resource package (Base package) and at least one self-adaptive function package (Dynamic Feature package).

Thus, it can be determined according to the attribute information whether one class file is required to be distributed into the Base package or a corresponding Dynamic Feature package, and the class file is correctly classified. In this case, the Base package contains code and resource(s) which can be accessed by each APK (Android Package) after AAB packages of the target application are disassembled, and can provide basic functions of the target application. When the user downloads the target application, the base resource APK(s) corresponding to the Base package are downloaded first. The Dynamic Feature package corresponds to each self-adaptive function APK.

Illustratively, according to the acquired attribute information, a class file whose attribute information indicates that a basic function is provided may be distributed into the Base package, a class file whose attribute information indicates that other class file(s) in the Base package depend on may be distributed into the Base package, and a class file whose attribute information indicates that a code resource file of a plurality of Dynamic Feature packages depend on may be distributed into the Base package. In particular, in a case where attribute information of a code resource in any class file indicates that only a code resource of one self-adaptive function is dependent on the code resource of the class file, the any class file is distributed into a corresponding self-adaptive function resource package, i.e., a class file on which only a code resource file of one Dynamic Feature package is dependent is distributed into a corresponding Dynamic Feature package, which can avoid packaging the unnecessary class file(s) in the Base package into the Base package, and thus can reduce the file volume of the Base package.

S130, generating, based on each the sub-code resource package, a target application package in a target format.

Finally, in this step, for each sub-code resource package after class file distribution, further compiling and packaging each code resource file to generate a target application package in an AAB format.

Figure 2:
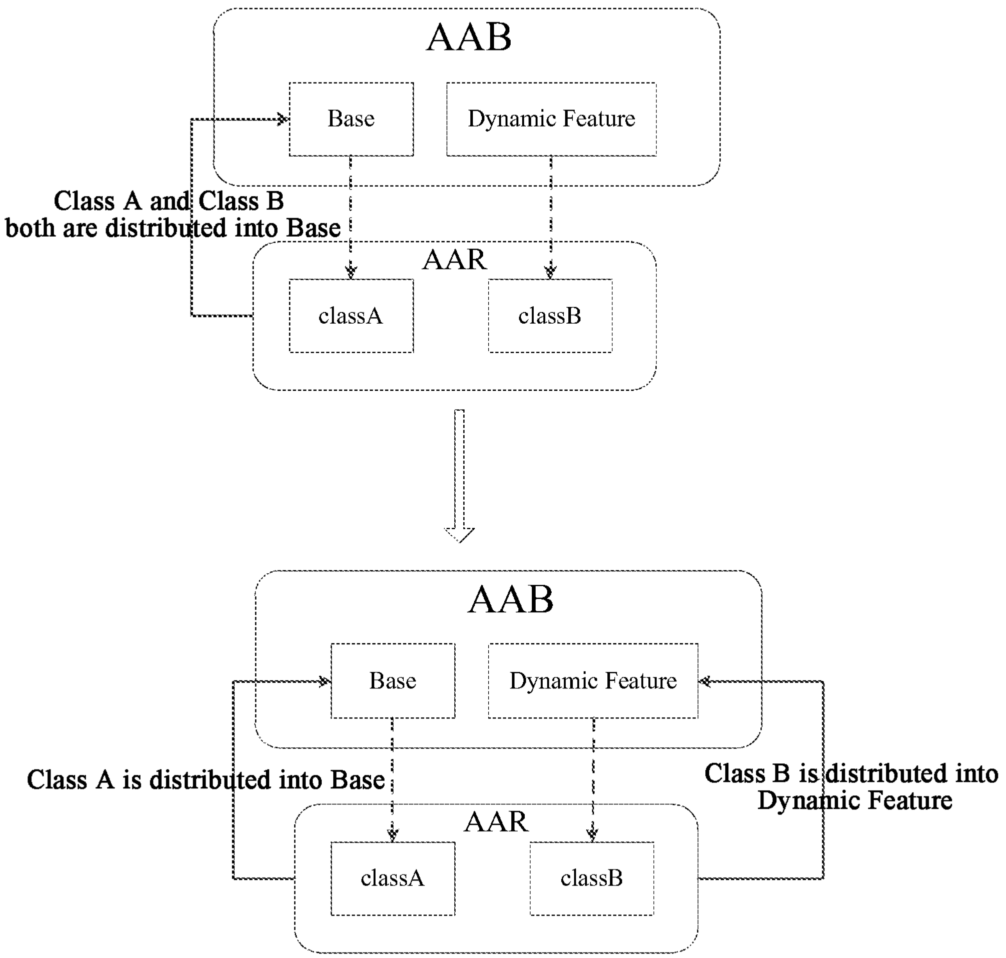
FIG. 2 is a diagram of an application effect of a method for application package generation provided by an embodiment of the present disclosure.

FIG. 2 shows a comparison before and after an application package is generated using solution(s) of the embodiment (s), wherein in a case that the solution(s) of the embodiment (s) are not used, in an AAR file, a class file (class A) on which only a Base module is dependent and a class file (class B) on which only one Dynamic Feature module is dependent are both packaged in the Base package of the Base module. However, the Class B is a class file which is not necessarily packaged in the Base package. If the solution(s) in the embodiment(s) are adopted, after attribute analysis on various types of files is performed, the Class A will be distributed into the Base package, and the Class B will be distributed into the Dynamic Feature package of a corresponding Dynamic Feature module.

With the solution(s) of the embodiment(s) of the present disclosure, in a process of generating an application package based on an AAR file of a target application, after a code resource file of the target application is acquired, first, attribute information of a code resource in each class file in the code resource file is parsed; then, each class file is distributed into a corresponding sub-code resource package according to the attribute information, so that the code resource file is sub-packaged with a smaller file sub-packaging granularity, making the sub-packaging of the code resource file more accurate; and finally, a target application package in a target format is generated based on each the sub-code resource package after code resource file sub-packaging is performed correctly, so that the volume of a base resource package of a target application can be reduced, and the installation and use of the target application are more friendly to a user. The solution(s) of the embodiment(s) of the present disclosure solve a problem that the base resource package is not simple enough due to a large file packaging granularity of an application package, and can perform a sub-packaging process of an application resource with a class file granularity so as to obtain an application package occupying a smaller storage space after code resource allocation is optimized.

Figure 3:
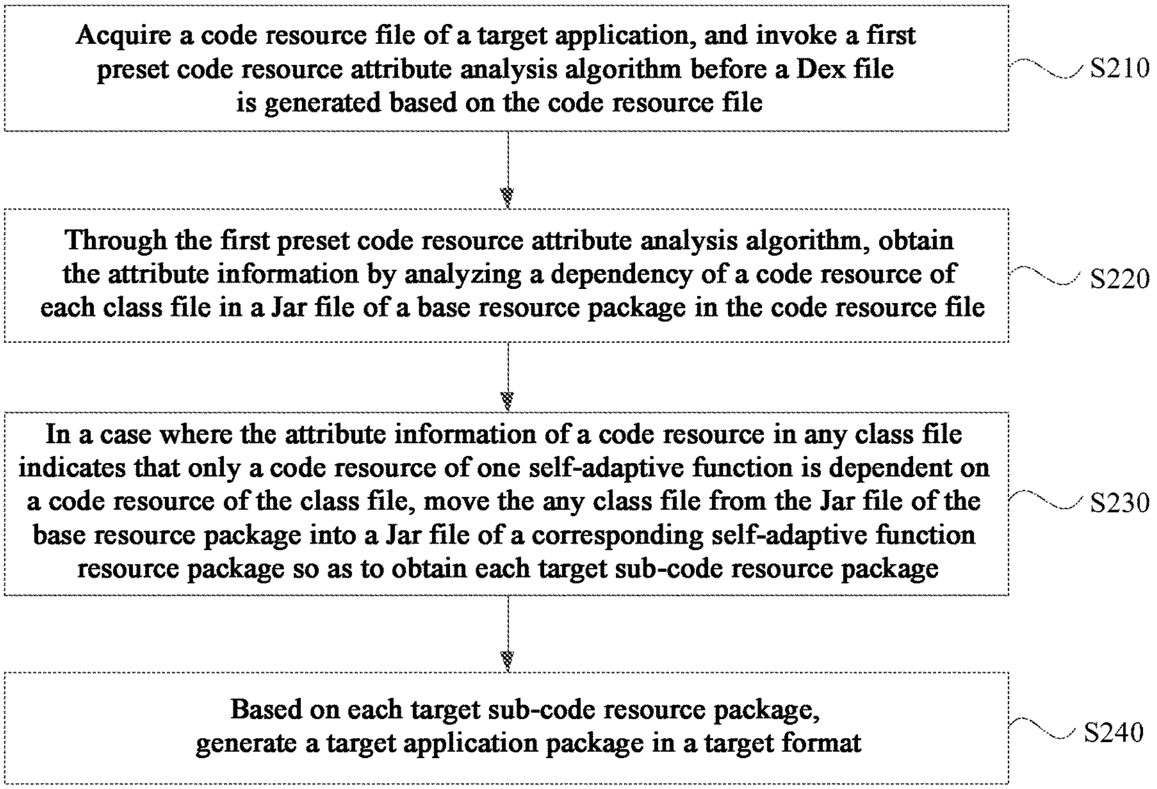
FIG. 3 is a flow diagram of a method for application package generation provided by an embodiment of the present disclosure.

FIG. 3 is a flow diagram of a method for application package generation provided by an embodiment of the present disclosure, and the embodiment of the present disclosure is applicable to a scenario of packaging an application into a distribution format of Android App Bundle (AAB), and further describes a specific process for performing an implementation of attribute analysis of a class file, and the method can be executed by an apparatus for application package generation, and the apparatus can be implemented in the form of software and/or hardware, optionally, implemented by an electronic device, and the electronic device can be a mobile terminal, a PC or a server, etc.

As shown in FIG. 3, the method for application package generation comprises:

S210, acquiring a code resource file of a target application, and invoking a first preset code resource attribute analysis algorithm before a Dex file is generated based on the code resource file.

The Dex (Dalvik Executable) file is a bytecode file after source code files are compiled, reconstructed, rearranged, compressed and confused in Android system, and is a result of further processing on class files, which will make the volume of source code files smaller. Meanwhile, since one Dex file is the result of integration of multiple class files, the amount of I/O can also be reduced.

In the embodiment, before the class files in individual sub-code resource packages are integrated to generate the Dex file, the sub-packaging process can be performed on each code resource file in the AAR of the target application, i.e., before the Dex file is generated based on the code resource file, the first preset code resource attribute analysis algorithm is invoked to analyze attribute information of the code resource of each class file in each code resource file in the AAR of the target application.

Specifically, when the application package in the AAB format is generated through AGP (Android Gralde Plugin) packaging, the first preset code resource attribute analysis algorithm can be invoked before a function node (split Variant Dex) for splitting the attribution of class file(s), and a way of invoking can use a hook function to realize the invoking of the algorithm.

S220, through the first preset code resource attribute analysis algorithm, obtaining the attribute information by analyzing a dependency of a code resource of each class file in a Jar file of a base resource package in the code resource file.

Before the Dex file is generated, the class files in the Base package and Dynamic Feature package are presented in the form of JAR (Java Archive) package, and each Jar package may contain one or more compiled class files, which can reduce the transmission volume of class files.

When the attribute information of the code resource of each class file in the Jar file is parsed, information indicating a class file dependency in a bytecode content of each class file can be extracted, so that the attribute information of the target is obtained, and then a class file on which only one Dynamic Feature package is dependent can be found according to the attribute information.

S230, in a case where the attribute information of a code resource in any class file indicates that only a code resource of one self-adaptive function is dependent on a code resource of the class file, moving the any class file from the Jar file of the base resource package to a Jar file of a corresponding self-adaptive function resource package so as to obtain each target sub-code resource package.

It can be understood that the basis for generating the Dex file is class files in individual sub-code resource packages, i.e., the Dex file in the Base package is generated based on a class file in Base Jar in the Base package, and the Dex file in the Dynamic Feature package is generated based on a class file in Dynamic Feature Jar in the Dynamic Feature package. Updating of class files in Base Jar and Dynamic Feature Jar is achieved by moving the class files on which only the code resource of one self-adaptive function is dependent. At this time, each target sub-code resource package, i.e. the updated Base Jar and Dynamic Feature Jar, is obtained.

Specifically, moving the any class file from the Jar file of the base resource package to the Jar file of the corresponding self-adaptive function resource package can first copy the any class file to the Jar file of the corresponding self-adaptive function resource package, and then delete the any class file from the Jar file of the base resource package which the any class file is originally located at.

S240, based on each target sub-code resource package, generating a target application package in a target format.

In this step, the Dex file may be generated based on the further compiling of each target sub-code resource package, and then an AAB package for the target application may be generated based on the further packaging of each target sub-code resource package.

With the solution(s) of the embodiment(s) of the present disclosure, in a process of generating an application package based on an AAR file of a target application, after the code resource file for packaging and generating the AAB package of the target application is obtained, and before the Dex file is generated based on the code resource file, the first preset code resource attribute analysis algorithm is invoked to parse the attribute information of the code resource of each class file in the code resource file; then, each class file is distributed into a corresponding sub-code resource package according to the attribute information, so that the code resource file is sub-packaged with a smaller file sub-packaging granularity, making the sub-packaging of the code resource file more accurate; and finally, a target application package in a target format is generated based on each sub-code resource package after code resource file sub-packaging is performed correctly, so that the volume of a base resource package of a target application can be reduced, and the installation and use of the target application are more friendly to a user. The solution(s) of the embodiment(s) of the present disclosure solve a problem that the base resource package is not simple enough due to a large file packaging granularity of an application package, and can perform a sub-packaging process of an application resource with a class file granularity so as to obtain an application package occupying a smaller storage space after code resource allocation is optimized.

Figure 4:
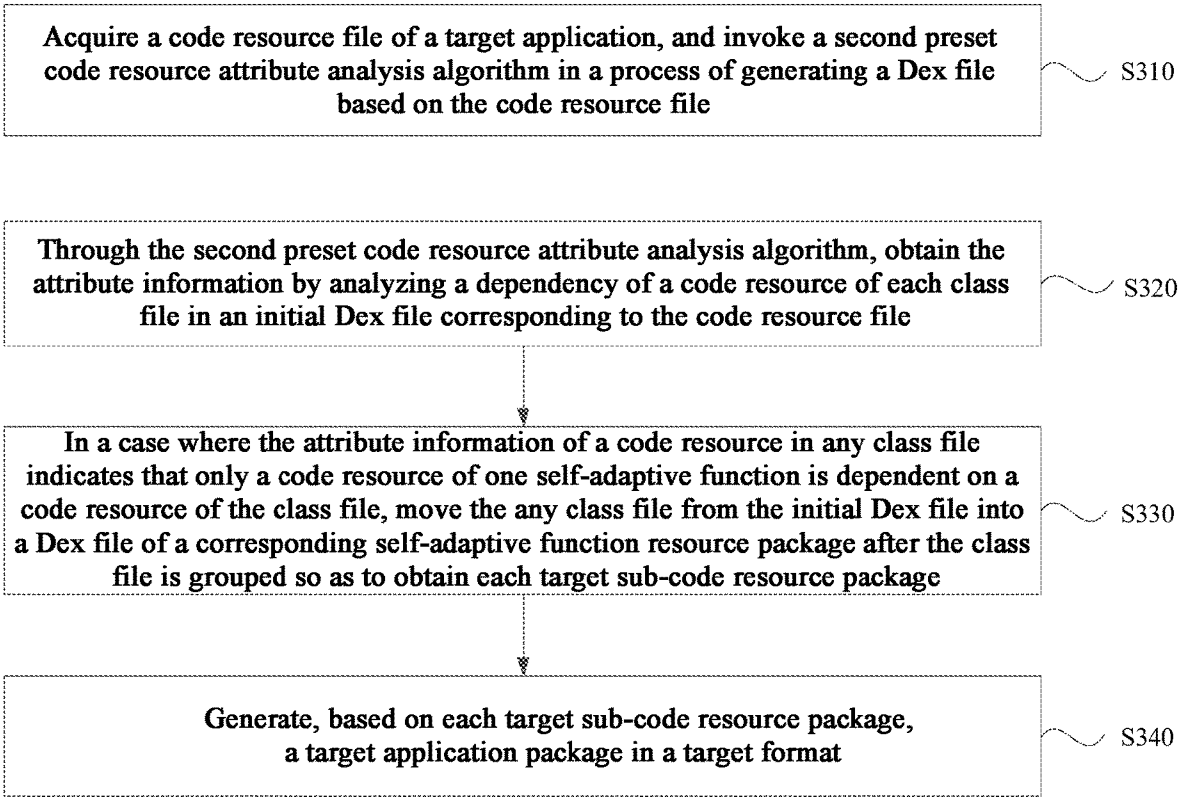
FIG. 4 is a flow diagram of a method for application package generation provided by an embodiment of the present disclosure.

FIG. 4 is a flow diagram of a method for application package generation provided by an embodiment of the present disclosure, and the embodiment of the present disclosure is applicable to a scenario of packaging an application into a distribution format of Android App Bundle (AAB), and further describes an optional embodiment for implementing attribute analysis on a class file, and the method can be executed by an apparatus for application package generation, and the apparatus can be implemented in the form of software and/or hardware, optionally, implemented by an electronic device, and the electronic device can be a mobile terminal, a PC or a server, etc.

As shown in FIG. 4, the method for application package generation comprises:

S310, acquiring a code resource file of a target application, and invoking a second preset code resource attribute analysis algorithm in a process of generating a Dex file based on the code resource file.

The process of generating the Dex file(s) is a process of reconstructing and integrating class file(s) in Base Jar in a base resource package and class file(s) in Dynamic Feature Jar in a self-adaptive function resource package in the code resource file, and each class in each generated Dex file can share data.

Considering the large granularity of class file sub-packaging in the prior art, it is possible to package class file(s) that are unnecessary to be packaged in Base Jar into the Base Jar, which cause the generated Base Dex to contain unnecessary class file content. Then, the second preset code resource attribute analysis algorithm can be invoked in the process of generating the Dex file based on the code resource file to parse attribute information of each class file so as to optimize the result of sub-packaging the class file(s).

Specifically, when an application package in an AAB format is generated through AGP (Android Gralde Plugin) packaging, the second preset code resource attribute analysis algorithm can be invoked when a function for splitting the attribution of class file(s) (split Variant Dex) is performed, and the way of invoking may use a hook function to realize the invoking of the algorithm. The second preset code resource attribute analysis algorithm may be one customized implementation algorithm for the function of splitting the attribution of class file(s).

S320, through the second preset code resource attribute analysis algorithm, obtaining the attribute information by analyzing a dependency of a code resource of each class file in an initial Dex file corresponding to the code resource file.

The initial Dex file refers to the Base Dex and Dynamic Feature Dex that have not undergone class file integration. By the second preset code resource attribute analysis algorithm, information indicating the class file dependency in the byte code content of each class file in the initial Dex file can be analyzed so as to obtain attribute information of a target. The attribute information may be any attribute information that can affect the result of the distribution of the class file, for example, attribute information such as the dependency of the class in the class file, the scope of the class, and directory attribution information.

S330, in a case where the attribute information of a code resource in any class file indicates that only a code resource of one self-adaptive function is dependent on a code resource of the class file, moving the any class file from the initial Dex file into a Dex file of a corresponding self-adaptive function resource package after the class file is grouped so as to obtain each target sub-code resource package.

In the process of generating the final Dex file, the attribution of the class file is optimized, and accordingly an optimized target sub-code resource package can be obtained. It should be understood and that, at this time, each target sub-code resource package is a Base Dex of a base resource package and a Dynamic Feature Dex of a self-adaptive function package generated based on the initial Dex file after the correct distributing of the class file(s). The class file(s) that are not necessarily packaged in the file package are reduced in the optimized Base Dex, thereby further reducing the file volume of the Base code resource package. Thus, on a basis that the user's use of the target application is not affected, the user can download a base resource package of the application which occupies less memory space, and then individually download a corresponding self-adaptive function resource package according to requirements of function use.

S340, generating, based on each target sub-code resource package, a target application package in a target format.

The AAB package for the target application may be generated based on the further compiling and packaging of each target sub-code resource package.

With the solution(s) of the embodiment(s) of the present disclosure, in a process of generating an application package based on an AAR file of a target application, in a process of generating a Dex file based on an AAR code resource file, the second preset code resource attribute analysis algorithm is invoked to parse the attribute information of the code resource in each class file in the code resource file; then, each class file is distributed into a corresponding sub-code resource package according to the attribute information, so that the code resource file is sub-packaged with a smaller file sub-packaging granularity, making the sub-packaging of the code resource file more accurate; and finally, a target application package in a target format is generated based on each sub-code resource package after code resource file sub-packaging is performed correctly, so that the volume of a base resource package of a target application can be reduced, and the installation and use of the target application are more friendly to a user. The solution(s) of the embodiment(s) of the present disclosure solve a problem that the base resource package is not simple enough due to a large file packaging granularity of an application package, and can perform a sub-packaging process of an application resource with a class file granularity so as to obtain an application package occupying a smaller storage space after code resource allocation is optimized.

Figure 5:
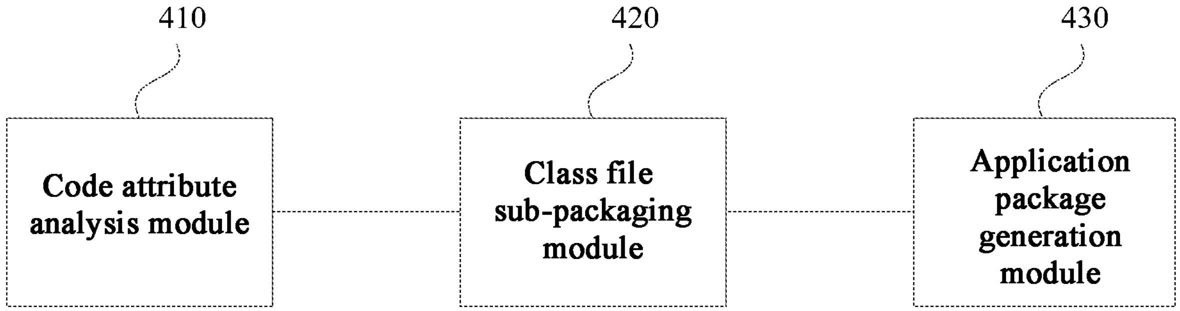
FIG. 5 is a schematic diagram of an apparatus for application package generation provided by an embodiment of the present disclosure.

FIG. 5 is a schematic diagram of an apparatus for application package generation provided by an embodiment of the present disclosure, and the apparatus is applicable to a scenario of packaging an application into a distribution format of Android App Bundle, and the apparatus for application package generation can be implemented in the form of software and/or hardware and can be configured to an electronic device, and the electronic device can be a mobile terminal, a PC or a server, etc.

As shown in FIG. 5, the apparatus for application package generation comprises: a code attribute analysis module 410, a class file sub-packaging module 420, and an application package generation module 430.

The code attribute analysis module 410 is used for acquiring a code resource file of a target application and parsing attribute information of a code resource in each class file in the code resource file; the class file sub-packaging module 420 is used for distributing each class file into a corresponding sub-code resource package in accordance with the attribute information; the application package generation module 430 for generating, based on each sub-code resource package, a target application package in a target format; wherein the code resource file of the target application is an AAR file of the target application.

With the solution(s) provided by the embodiment(s) of the present disclosure, in a process of generating an application package based on an AAR file of a target application, after a code resource file of the target application is acquired, first, attribute information of a code resource in each class file in the code resource file is parsed; then, each class file is distributed into a corresponding sub-code resource package according to the attribute information, so that the code resource file is sub-packaged with a smaller file sub-packaging granularity, making the sub-packaging of the code resource file more accurate; and finally, a target application package in a target format is generated based on each sub-code resource package after code resource file sub-packaging is performed correctly, so that the volume of a base resource package of a target application can be reduced, and the installation and use of the target application are more friendly to a user. The solution(s) of the embodiment(s) of the present disclosure solve a problem that the base resource package is not simple enough due to a large file packaging granularity of an application package, and can perform a sub-packaging process of an application resource with a class file granularity so as to obtain an application package occupying a smaller storage space after code resource allocation is optimized.

On the basis of any alternative solution in the embodiments of the present disclosure, optionally, the code attribute analysis module 410 is specifically used for:

- extracting information indicating a class file dependency in a bytecode content of each class file as the attribute information.

On the basis of any alternative solution in the embodiments of the present disclosure, optionally, the class file sub-packaging module 420 is specifically used for:

- in a case where the attribute information of a code resource in any class file indicates that only a code resource of one self-adaptive function is dependent on a code resource of the class file, distributing the any class file into a corresponding self-adaptive function resource package.

On the basis of any alternative solution in the embodiments of the present disclosure, optionally, the code attribute analysis module 410 is specifically used for:

- prior to generating a Dex file based on the code resource file, invoking a first preset code resource attribute analysis algorithm;
- obtaining the attribute information by analyzing a dependency of a code resource of each class file in a Jar file of a base resource package in the code resource file through the first preset code resource attribute analysis algorithm.

On the basis of the above-mentioned alternative solution in the embodiment of the present disclosure, optionally, the class file sub-packaging module 420 is specifically used for:

in a case where the attribute information of a code resource in any class file indicates that only a code resource of one self-adaptive function is dependent on a code resource of the class file, moving the any class file from the Jar file of the base resource package to a Jar file of the corresponding self-adaptive function resource package.

On the basis of any alternative solution in the embodiments of the present disclosure, optionally, the code attribute analysis module 410 may further be specifically used for:

in a process of generating a Dex file based on the code resource file, invoking a second preset code resource attribute analysis algorithm;

obtaining the attribute information by analyzing a dependency of a code resource of each class file in an initial Dex file corresponding to the code resource file through the second preset code resource attribute analysis algorithm.

On the basis of the above-mentioned alternative solution in the embodiment of the present disclosure, optionally, the class file sub-packaging module 420 is specifically used for:

in a case where the attribute information of a code resource in any class file indicates that only a code resource of one self-adaptive function is dependent on a code resource of the class file, moving the any class file from the initial Dex file to a Dex file of a corresponding self-adaptive function resource package after the class file is grouped.

The above-mentioned apparatus for application package generation provided by an embodiment of the present disclosure can execute a method for application package generation provided by any embodiment of the present disclosure, and has functional modules and advantageous effects corresponding to the executed method.

It should be noted that the various units and modules included in the above-mentioned apparatus are merely divided according to functional logic, but are not limited to the above-mentioned division as long as corresponding functions can be realized; in addition, the specific names of the functional units are merely for the convenience of distinguishing each other and are not intended to limit the scope of the disclosed embodiments.

Figure 6:
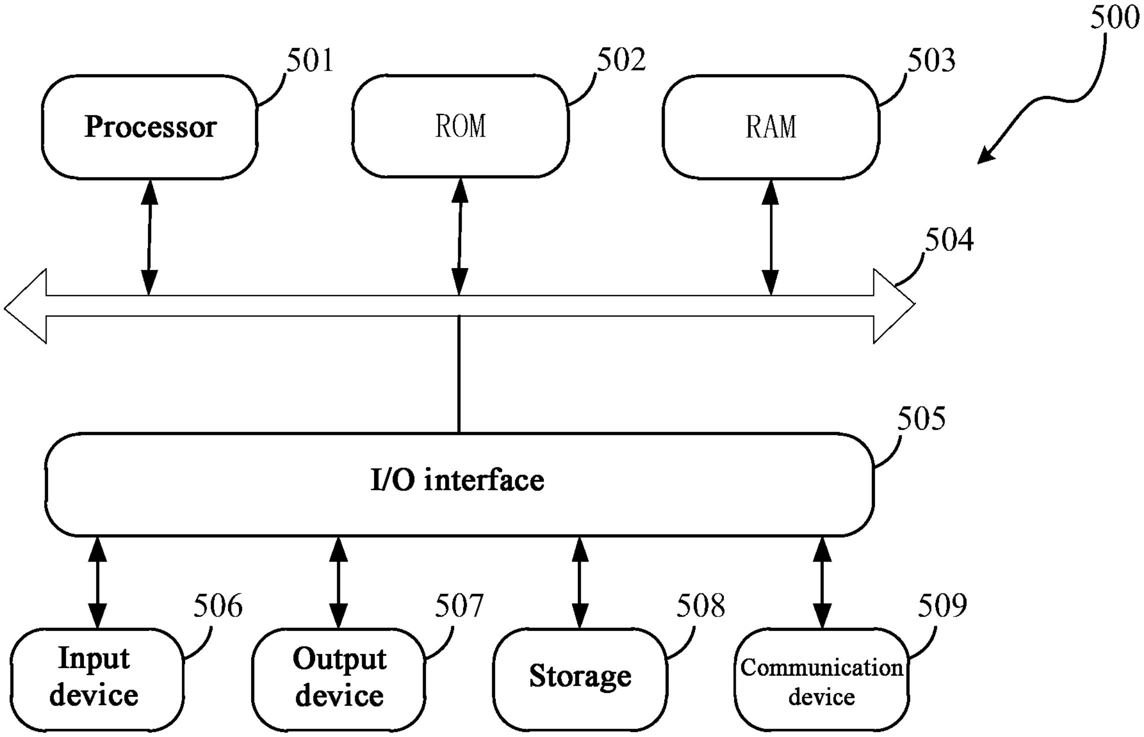
FIG. 6 is a schematic diagram of an electronic device provided by an embodiment of the present disclosure.

FIG. 6 is a schematic structural diagram of an electronic device according to an embodiment of the present disclosure. Reference is now made to FIG. 6, which illustrates a schematic structural diagram of an electronic device (e.g. a terminal device or server in FIG. 6) 500 suitable for implementing embodiments of the present disclosure. The terminal device in embodiments of the present disclosure may include, but is not limited to, a mobile terminal such as a mobile phone, a notebook computer, a digital broadcast receiver, a PDA (Personal Digital Assistant), a PAD (Tablet Computer), a PMP (Portable Multimedia Player), an in-vehicle terminal (e.g. an in-vehicle navigation terminal), etc. and a fixed terminal such as a digital TV, a desktop computer, etc. The electronic device shown in FIG. 6 is merely an example and should not impose any limitations on the functionality and scope of use of embodiments of the present disclosure.

As shown in FIG. 6, the electronic device 500 may include a processor (e.g. central processing unit, graphics processor, etc.) 501 that may perform various suitable actions and processes in accordance with a program stored in a read-only memory (ROM) 502 or a program loaded from a storage 508 into a random access memory (RAM) 503. In the RAM 503, various programs and data required for the operation(s) of the electronic device 500 are also stored. The processor 501, the ROM 502 and the RAM 503 are connected to each other via a bus 504. An input/output (I/O) interface 505 is also coupled to bus 504.

In general, the following devices may be connected to the I/O interface 505: an input device 506 including, for example, a touch screen, a touch pad, a keyboard, a mouse, a camera, a microphone, an accelerometer, a gyroscope, etc.; an output device 507 including, for example, a liquid crystal display (LCD), a speaker, a vibrator, etc.; a storage 508 including, for example, a magnetic tape, a hard disk, etc.; and a communication device 509. The communication device 509 may allow the electronic device 500 to communicate wirelessly or wired with other devices to exchange data. While FIG. 6 illustrates an electronic device 500 having various means, it is to be understood that not all illustrated devices are required to be implemented or provided. More or fewer devices may alternatively be implemented or provided.

In particular, the processes described above with reference to flowcharts may be implemented as computer software programs in accordance with embodiments of the present disclosure. For example, embodiments of the present disclosure include a computer program product comprising a computer program embodied on a non-transitory computer-readable medium, the computer program including program code for performing the method illustrated by the flowcharts. In such embodiments, the computer program may be downloaded and installed from a network via the communication device 509, or be installed from the storage 508, or be installed from the ROM 502. When the computer program is executed by the processor 501, the above-described functions defined in a method of an embodiment of the present disclosure are performed.

The names of messages or information interacted between devices in embodiments of the present disclosure are for illustrative purposes only and are not intended to limit the scope of such messages or information.

The electronic device provided by the embodiment of the present disclosure and the method for application package generation provided by the above-mentioned embodiment belong to the same inventive concept, technical details not described in detail in the present embodiments can be referred to the above-mentioned embodiments, and the present embodiments have the same advantageous effects as the above-mentioned embodiments.

Embodiments of the present disclosure provide a computer storage medium having stored thereon a computer program which, when executed by a processor, implements a method for application package generation provided by the above embodiment(s).

Note that the computer-readable medium described above in the disclosure can be either a computer-readable signal medium or a computer-readable storage medium or any combination thereof. The computer-readable storage medium may be, for example, but not limited to, an electronic, magnetic, optical, electromagnetic, infrared, or semiconductor system, apparatus, or device, or any combination thereof. More specific examples of the computer readable storage medium may include, but not limited to, an electrical connection having one or more wire, a portable computer diskette, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof. In the disclosure, the computer-readable storage medium may be any tangible medium that contains or stores a program that can be used by or in connection with an instruction execution system, apparatus, or device. However, in the disclosure, the computer-readable signal medium may include a data signal propagated in baseband or as part of a carrier wave, on which computer-readable program code is embodied. Such propagated data signal may take many forms, which include an electromagnetic signal, an optical signal, or any suitable combination thereof. The computer-readable signal medium may also be any computer-readable medium other than the computer-readable storage medium that can send, propagate, or transfer the program for use by or in connection with the instruction execution system, apparatus, or device. The program code contained on the computer-readable medium may be transmitted over any suitable medium including: a wire, an optic cable, a radio frequency (RF), and the like, or any suitable combination thereof.

In some implementations, clients, servers may communicate using any currently known or future developed network protocol such as HTTP (Hyper Text Transfer Protocol), and may be interconnected with any form or medium of digital data communication (e.g. a communication network). Examples of the communication network include a local area network (LAN), a wide area network (WAN), an internetwork (e.g. the Internet) and a peer-to-peer network (e.g. an ad hoc peer-to-peer network), and any currently known or future developed network.

The computer-readable medium may be contained in the electronic device; it may also be present separately and not fitted into the electronic device.

The computer-readable medium carries one or more programs that, when executed by the electronic device, cause the electronic device to:

acquire a code resource file of a target application, and parse attribute information of a code resource in each class file in the code resource file;

distribute each class file into a corresponding sub-code resource package in accordance with the attribute information;

generate, based on each sub-code resource package, a target application package in a target format;

wherein the code resource file of the target application is an AAR file of the target application.

Computer program code for carrying out operations of the present disclosure may be written in one or more programming language including an object oriented programming language such as Java, Smalltalk, C++, and conventional procedural programming languages-such as the "C" language or similar programming languages, or a combination thereof. The program code may be executed entirely on the user's computer, partly on the user's computer, as a stand-alone software package, partly on the user's computer and partly on a remote computer, or entirely on the remote computer or server. In the scenario involving the remote computer, the remote computer may be connected to the user's computer through any type of network including a local area network (LAN) or a wide area network (WAN), or the connection may be made to an external computer (e.g. through the Internet using an Internet Service Provider).

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a module, a program segment, or a portion of code, which includes one or more executable instructions for implementing the specified logical function(s). It should also be noted that, in some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block in the block diagrams and/or flowcharts, and a combination of blocks in the block diagrams and/or flowcharts, can be implemented by a special purpose hardware-based system which performs the specified function(s) or operation (s), or a combination of a special purpose hardware and computer instructions.

The units involved in the embodiments disclosed herein may be implemented in software or hardware. The name of the unit do not constitute a limitation on the unit itself in some cases, for example, the first acquisition unit may also be described as "a unit acquiring at least two internet protocol addresses".

The functions described herein above may be performed, at least in part, by one or more hardware logic component(s). For example, an exemplary type of hardware logic component that may be used includes: a field programmable gate array (FPGA), an application specific integrated circuit (ASIC), an application specific standard product (ASSP), a system on a chip (SOC), a complex programmable logic device (CPLD), and the like, which is not limiting herein.

In the context of this disclosure, the machine-readable medium can be a tangible medium that can contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. A more specific example of the machine-readable storage medium may include an electrical connection based on one or more wire(s), a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof.

Embodiments of the present disclosure also provide a computer program product including a computer program that, when executed by a processor, implements a method for application package generation as provided by any one of the embodiments of the present disclosure.

In a process of an implementation of the computer program product, computer program code for carrying out operations of the present disclosure may be written in one or more programming languages including an object oriented programming language such as Java, Smalltalk, C++, and conventional procedural programming languages such as the "C" language or similar programming languages, or a combination thereof. The program code may execute entirely on the user's computer, partly on the user's computer, as a stand-alone software package, partly on the user's computer and partly on a remote computer, or entirely on the remote computer or server. In the scenario involving the remote computer, the remote computer may be connected to the user's computer through any type of network including a local area network (LAN) or a wide area network (WAN), or the connection may be made to an external computer (e.g. through the Internet using an Internet Service Provider).

According to one or more embodiments of the present disclosure, [Example 1] provides a method for application package generation, comprising:

acquiring a code resource file of a target application, and parsing attribute information of a code resource in each class file in the code resource file;

distributing each class file into a corresponding sub-code resource package in accordance with the attribute information;

generating, based on each sub-code resource package, a target application package in a target format;

wherein the code resource file of the target application is an AAR file of the target application.

According to one or more embodiments of the present disclosure, [Example 2] provides a method for application package generation, further comprising:

In some alternative implementations, parsing the attribute information of the code resource in each class file in the code resource file includes:

extracting information indicating a class file dependency in a bytecode content of each class file as the attribute information.

According to one or more embodiments of the present disclosure, [Example 3] provides a method for application package generation, comprising:

In some alternative implementations, distributing each class file into the corresponding sub-code resource package in accordance with the attribute information includes:

in a case where the attribute information of a code resource in any class file indicates that only a code resource of one self-adaptive function is dependent on a code resource of the class file, distributing the any class file into a corresponding self-adaptive function resource package.

According to one or more embodiments of the present disclosure, [Example 4] provides a method for application package generation, further comprising:

In some alternative implementations, parsing the attribute information of the code resource in each class file in the code resource file includes:

prior to generating a Dex file based on the code resource file, invoking a first preset code resource attribute analysis algorithm;

obtaining the attribute information by analyzing a dependency of a code resource of each class file in a Jar file of a base resource package in the code resource file through the first preset code resource attribute analysis algorithm.

According to one or more embodiments of the present disclosure, [Example 5] provides a method for application package generation, further comprising:

In an alternative implementation, distributing each class file into the corresponding sub-code resource package in accordance with the attribute information includes:

in a case where the attribute information of a code resource in any class file indicates that only a code resource of one self-adaptive function is dependent on a code resource of the class file, moving the any class file from the Jar file of the base resource package into a Jar file of a corresponding self-adaptive function resource package.

According to one or more embodiments of the present disclosure, [Example 6] provides a method for application package generation, further comprising:

In some alternative implementations, parsing the attribute information of the code resource in each class file in the code resource file includes:

in a process of generating a Dex file based on the code resource file, invoking a second preset code resource attribute analysis algorithm;

obtaining the attribute information by analyzing a dependency of a code resource of each class file in an initial Dex file corresponding to the code resource file through the second preset code resource attribute analysis algorithm.

According to one or more embodiments of the present disclosure, [Example 7] provides a method for application package generation, further comprising:

In an alternative implementation, distributing each class file into the corresponding sub-code resource package in accordance with the attribute information includes:

in a case where the attribute information of a code resource in any class file indicates that only a code resource of one self-adaptive function is dependent on a code resource of the class file, moving the any class file from the initial Dex file into a Dex file of a corresponding self-adaptive function resource package after the class file is grouped.

According to one or more embodiments of the present disclosure, [Example 8] provides an apparatus for application package generation, comprising:

a code attribute analysis module for acquiring a code resource file of a target application and parsing attribute information of a code resource in each class file in the code resource file;

a class file sub-packaging module for distributing each class file into a corresponding sub-code resource package in accordance with the attribute information;

an application package generation module for generating, based on each sub-code resource package, a target application package in a target format;

wherein the code resource file of the target application is an AAR file of the target application.

According to one or more embodiments of the present disclosure, [Example 9] provides an apparatus for application package generation, further comprising:

In an alternative implementation, the code attribute analysis module is specifically used for:

extracting information indicating a class file dependency in a bytecode content of each class file as the attribute information.

According to one or more embodiments of the present disclosure, [Example 10] provides an apparatus for application package generation, further comprising:

In an alternative implementation, the class file sub-packaging module is specifically used for:

in a case where the attribute information of a code resource in any class file indicates that only a code resource of one self-adaptive function is dependent on a code resource of the class file, distributing the any class file into a corresponding self-adaptive function resource package.

According to one or more embodiments of the present disclosure, [Example 11] provides an apparatus for application package generation, further comprising:

In an alternative implementation, the code attribute analysis module is specifically used for:

prior to generating a Dex file based on the code resource file, invoking a first preset code resource attribute analysis algorithm;

obtaining the attribute information by analyzing a dependency of a code resource of each class file in a Jar file of a base resource package in the code resource file through the first preset code resource attribute analysis algorithm.

According to one or more embodiments of the present disclosure, [Example 12] provides an apparatus for application package generation, further comprising:

In an alternative implementation, the class file sub-packaging module is specifically used for:

in a case where the attribute information of a code resource in any class file indicates that only a code resource of one self-adaptive function is dependent on a code resource of the class file, moving the any class file from the Jar file of the base resource package into a Jar file of a corresponding self-adaptive function resource package.

According to one or more embodiments of the present disclosure, [Example 13] provides an apparatus for application package generation, further comprising:

In an alternative implementation, the code attribute analysis module may further be specifically used for:

in a process of generating a Dex file based on the code resource file, invoking a second preset code resource attribute analysis algorithm;

obtaining the attribute information by analyzing a dependency of a code resource of each class file in an initial Dex file corresponding to the code resource file through the second preset code resource attribute analysis algorithm.

According to one or more embodiments of the present disclosure, [Example 14] provides an apparatus for application package generation, further comprising:

In an alternative implementation, the class file sub-packaging module is specifically used for:

in a case where the attribute information of a code resource in any class file indicates that only a code resource of one self-adaptive function is dependent on a code resource of the class file, moving the any class file from the initial Dex file into a Dex file of a corresponding self-adaptive function resource package after the class file is grouped.

The foregoing description is only a preferred embodiment of the disclosure and is illustrative of principles of the technology employed. It will be appreciated by those skilled in the art that the scope of the disclosure is not limited to any particular combination of the features described above, but is intended to encompass any combination of the features described above or their equivalents without departing from the spirit of the disclosure. For example, the above-mentioned features and the technical features disclosed in the present disclosure (but not limited to) having similar functions are interchanged to form a technical solution.

Further, while operations are depicted in a particular order, this should not be understood as requiring that the operations be performed in the particular order shown or in sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

I claim:

1. A method for application package generation comprising:

acquiring a code resource file of a target application, and parsing attribute information of a code resource in each class file in the code resource file;

distributing each class file into a corresponding sub-code resource package in accordance with the attribute information;

generating, based on each sub-code resource package, a target application package in a target format;

wherein the code resource file of the target application is an AAR file of the target application;

wherein parsing the attribute information of the code resource in each class file in the code resource file comprises extracting information indicating a class file dependency in a bytecode content of each class file as the attribute information; and wherein distributing each class file into the corresponding sub-code resource package in accordance with the attribute information comprises in response to the attribute information of a code resource in any class file indicating that only a code resource of one self-adaptive function is dependent on a code resource of the class file, distributing any class file into a corresponding self-adaptive function resource package.

2. The method of claim 1, wherein parsing the attribute information of the code resource in each class file in the code resource file includes:

prior to generating a Dex file based on the code resource file, invoking a first preset code resource attribute analysis algorithm; and obtaining the attribute information by analyzing a dependency of a code resource of each class file in a Jar file of a base resource package in the code resource file through the first preset code resource attribute analysis algorithm.

3. The method of claim 2, wherein distributing each class file into the corresponding sub-code resource package in accordance with the attribute information includes:

in response to the attribute information of a code resource in any class file indicating that only a code resource of one self-adaptive function is dependent on a code resource of the class file, moving the any class file from the Jar file of the base resource package into a Jar file of a corresponding self-adaptive function resource package.

4. The method of claim 2, wherein parsing the attribute information of the code resource in each class file in the code resource file includes:

in a process of generating the Dex file based on the code resource file, invoking a second preset code resource attribute analysis algorithm; and obtaining the attribute information by analyzing a dependency of a code resource of each class file in an initial Dex file corresponding to the code resource file through the second preset code resource attribute analysis algorithm.

5. The method of claim 4, wherein distributing each class file into the corresponding sub-code resource package in accordance with the attribute information includes:

in response to the attribute information of a code resource in any class file indicating that only a code resource of one self-adaptive function is dependent on a code resource of the class file, moving the any class file from the initial Dex file into a Dex file of a corresponding self-adaptive function resource package after the class file is grouped.

6. An electronic device comprising:

one or more processors; a storage device for storing one or more programs, when the one or more programs are executed by the one or more processors, the one or more processors are caused to perform operations comprising:

acquiring a code resource file of a target application, and parsing attribute information of a code resource in each class file in the code resource file;

distributing each class file into a corresponding sub-code resource package in accordance with the attribute information;

generating, based on each sub-code resource package, a target application package in a target format;

wherein the code resource file of the target application is an AAR file of the target application;

wherein parsing the attribute information of the code resource in each class file in the code resource file comprises extracting information indicating a class file dependency in a bytecode content of each class file as the attribute information; and wherein distributing each class file into the corresponding sub-code resource package in accordance with the attribute information comprises in response to the attribute information of a code resource in any class file indicating that only a code resource of one self-adaptive function is dependent on a code resource of the class file, distributing any class file into a corresponding self-adaptive function resource package.

7. The electronic device of claim 6, wherein parsing the attribute information of the code resource in each class file in the code resource file includes:

prior to generating a Dex file based on the code resource file, invoking a first preset code resource attribute analysis algorithm; and obtaining the attribute information by analyzing a dependency of a code resource of each class file in a Jar file of a base resource package in the code resource file through the first preset code resource attribute analysis algorithm.

8. The electronic device of claim 7, wherein distributing each class file into the corresponding sub-code resource package in accordance with the attribute information includes:

in response to the attribute information of a code resource in any class file indicating that only a code resource of one self-adaptive function is dependent on a code resource of the class file, moving the any class file from the Jar file of the base resource package into a Jar file of a corresponding self-adaptive function resource package.

9. The electronic device of claim 7, wherein parsing the attribute information of the code resource in each class file in the code resource file includes:

in a process of generating the Dex file based on the code resource file, invoking a second preset code resource attribute analysis algorithm; and obtaining the attribute information by analyzing a dependency of a code resource of each class file in an initial Dex file corresponding to the code resource file through the second preset code resource attribute analysis algorithm.

10. The electronic device of claim 9, wherein distributing each class file into the corresponding sub-code resource package in accordance with the attribute information includes:

in response to the attribute information of a code resource in any class file indicating that only a code resource of one self-adaptive function is dependent on a code resource of the class file, moving the any class file from the initial Dex file into a Dex file of a corresponding self-adaptive function resource package after the class file is grouped.

11. A non-transitory computer-readable storage medium having stored thereon a computer program which, when executed by a processor, implements operations comprising:

acquiring a code resource file of a target application, and parsing attribute information of a code resource in each class file in the code resource file;

distributing each class file into a corresponding sub-code resource package in accordance with the attribute information;

generating, based on each sub-code resource package, a target application package in a target format;

wherein the code resource file of the target application is an AAR file of the target application;

wherein parsing the attribute information of the code resource in each class file in the code resource file comprises extracting information indicating a class file dependency in a bytecode content of each class file as the attribute information; and wherein distributing each class file into the corresponding sub-code resource package in accordance with the attribute information comprises in response to the attribute information of a code resource in any class file indicating that only a code resource of one self-adaptive function is dependent on a code resource of the class file, distributing any class file into a corresponding self-adaptive function resource package.

12. The non-transitory computer-readable storage medium of claim 11, wherein parsing the attribute information of the code resource in each class file in the code resource file includes:

prior to generating a Dex file based on the code resource file, invoking a first preset code resource attribute analysis algorithm; and obtaining the attribute information by analyzing a dependency of a code resource of each class file in a Jar file of a base resource package in the code resource file through the first preset code resource attribute analysis algorithm.

13. The non-transitory computer-readable storage medium of claim 12, wherein distributing each class file into the corresponding sub-code resource package in accordance with the attribute information includes:

in response to the attribute information of a code resource in any class file indicating that only a code resource of one self-adaptive function is dependent on a code resource of the class file, moving the any class file from the Jar file of the base resource package into a Jar file of a corresponding self-adaptive function resource package.

14. The non-transitory computer-readable storage medium of claim 12, wherein parsing the attribute information of the code resource in each class file in the code resource file includes:

in a process of generating the Dex file based on the code resource file, invoking a second preset code resource attribute analysis algorithm; and obtaining the attribute information by analyzing a dependency of a code resource of each class file in an initial Dex file corresponding to the code resource file through the second preset code resource attribute analysis algorithm.

15. The non-transitory computer-readable storage medium of claim 14, wherein distributing each class file into the corresponding sub-code resource package in accordance with the attribute information comprises:

in response to the attribute information of a code resource in any class file indicating that only a code resource of one self-adaptive function is dependent on a code resource of the class file, moving the any class file from the initial Dex file into a Dex file of a corresponding self-adaptive function resource package after the class file is grouped.

* * * * *